United States Patent [19]

Li

[11] Patent Number: 5,301,570
[45] Date of Patent: Apr. 12, 1994

[54] APPARATUS FOR CONNECTING AND AUXILIARY HANDLE TO A HANDLEBAR OF A BICYCLE

[76] Inventor: Min-Tsung Li, No. 2, Hsi-Chien Lane, Chin-Tun Tsuen, Hua-Tan Hsiang, Changhua Hsien, Taiwan

[21] Appl. No.: 127,603

[22] Filed: Sep. 28, 1993

[51] Int. Cl.$^5$ .................... B62K 21/12; F16C 11/00
[52] U.S. Cl. .................... 74/551.1; 74/551.8; 74/528; 74/529; 280/278; 403/33
[58] Field of Search .................... 74/551.1–551.8, 74/556, 557, 528, 529; 280/279, 281.1, 278; 403/191, 93, 95, 97

[56] References Cited

U.S. PATENT DOCUMENTS

| | | | |
|---|---|---|---|
| 3,481,218 | 12/1969 | Yoshikawa | 74/551.3 |
| 4,909,537 | 3/1990 | Tratner | 280/278 |
| 5,018,405 | 5/1991 | Chiu | 74/529 |
| 5,033,325 | 7/1991 | Giard | 74/551.8 X |
| 5,039,118 | 8/1991 | Huang | 74/551.3 |
| 5,056,805 | 10/1991 | Wang | 403/93 X |
| 5,062,179 | 11/1991 | Huang | 74/551.3 X |
| 5,106,117 | 4/1992 | Wang | 403/93 |
| 5,168,601 | 12/1992 | Liu | 403/95 X |
| 5,224,336 | 7/1993 | Lobbezoo et al. | 74/551.1 X |
| 5,240,265 | 8/1993 | Huang | 403/93 |

FOREIGN PATENT DOCUMENTS

| | | | |
|---|---|---|---|
| 30733 | of 1838 | United Kingdom | 74/551.4 |
| 395697 | 7/1933 | United Kingdom | 74/551.3 |

*Primary Examiner*—Vinh T. Luong
*Attorney, Agent, or Firm*—Beveridge, DeGrandi, Weilacher & Young

[57] ABSTRACT

An apparatus for connecting an auxiliary handle to a handlebar of a bicycle includes a tubular member having a partition plate which divides the tubular member into a first section which clamps the handlebar and a second section which has a first engaging member. A cylindrical member has a first end inserted into the second section of the tubular member. The cylindrical member has a blind bore and a second engaging member which engages the first engaging member of the tubular member in order to prevent the cylindrical member and tubular member being rotated with respect to each other. A bolt has a threaded end connected to the partition plate and an enlarged end. A spring member is disposed between the enlarged head of the bolt and the bottom of the blind bore of the cylindrical member, urging the first and second engaging members to engage each other. A lever arm has a first end and a second end extending into the blind bore of the cylindrical member and pivoted to the cylindrical member with the lever arm abutting against the enlarged head of the bolt.

5 Claims, 9 Drawing Sheets

5,301,570

APPARATUS FOR CONNECTING AND AUXILIARY HANDLE TO A HANDLEBAR OF A BICYCLE

BACKGROUND OF THE INVENTION

1. Field of the Invention

This invention relates to an apparatus for connecting an auxiliary handle to a handlebar of a bicycle, more particularly to an apparatus for connecting an auxiliary handle which can be easily and conveniently positioned relative to the handlebar of a bicycle when a rider is riding the bicycle.

2. Description of the Related Art

FIG. 1 shows a conventional handlebar 1 of a bicycle. The conventional handlebar 1 is suitable for a rider to grasp when he/she is riding on a normal road. However, the rider does not feel comfortable when he/she is riding on certain terrains, for example, a long, curved ramp because the conventional handlebar 1 of the bicycle cannot be adjusted to meet the requirement of riding ergonomics. Therefore, an improved handlebar has been developed to overcome the aforementioned drawback of the conventional handle bar. Two auxiliary handles 2 are respectively connected to the handlebar 1 of the bicycle with the use of the clamping members 4, as best illustrated in FIG. 2. Each of clamping members 4 is adapted to sleeve the handlebar 1 and fasten to the same by means of a screw 3. Therefore, the auxiliary handle 2 can be rotated with respect to the handlebar 1 so that the rider can adjust the angle between the rider's body and the plane defined by the handlebar 1. However, the adjustment of the auxiliary handles 2 inconveniences the rider when he/she is riding. This is because the screws 3 must be loosened to allow the auxiliary handles 2 to rotate and then threaded to cause the clamping members 4 to firmly connect to the handlebar 2.

SUMMARY OF THE INVENTION

It is therefore a main object of this invention to provide an apparatus for connecting an auxiliary handle to a handlebar of a bicycle which can be easily and conveniently positioned relative to the handlebar of the bicycle when a rider is riding the bicycle.

Accordingly, the apparatus for connecting an auxiliary handle to a handlebar of a bicycle of this invention, the apparatus comprises:

a tubular member having a partition plate with a central threaded hole provided therein, the partition plate dividing the tubular member into a first section which is adapted to clamp an end of the handlebar and a second section with a central bore, the second section of the tubular member having a first engaging member formed therein;

a cylindrical member with a first end and a second end, the first end of the cylindrical member being inserted into the second section of the tubular member, the cylindrical member having a blind bore extending axially from the second end to the first end of the cylindrical member, a bottom of the blind bore which is formed near the first end of the cylindrical member and has a central opening aligned with the central threaded hole of the partition plate of the tubular member, the first end the cylindrical member further having a second engaging member which engages the first engaging member of the tubular member in order to prevent the cylindrical member and tubular member being rotated with respect to each other, the cylindrical member having a radial hole which intercommunicates the blind bore and the exterior of the cylindrical member;

a bolt having a threaded end threaded to the central threaded hole of the partition plate of the tubular member and an enlarged end;

a spring member disposed between the enlarged head of the bolt and the bottom of the blind bore of the cylindrical member, urging the first end of the cylindrical member toward the partition plate of the tubular member in order to allow the first and second engaging members to engage each other; and a lever arm having a first end and a second end extending into the blind bore of the cylindrical member through the radial hole of the cylindrical member, the second end of the lever arm abutting against the enlarged head of the bolt, the lever arm being pivoted to the cylindrical member in such a manner that the lever arm pushes the second end of the cylindrical member to move away from the tubular member in order to disengage the second engaging member from the first engaging member when the first end of the lever arm is rotated clockwise, the lever arm being rotated counterclockwise to allow the second end of the cylindrical member to move toward the tubular member in order to permit the second engaging member to engage the first engaging member by means of the restoring force of the spring member.

Other features and advantages of this invention will become apparent in the following detailed description of the preferred embodiments of this invention with reference to the accompanying drawings.

DETAILED DESCRIPTION OF THE PREFERRED EMBODIMENTS

Figure 1:
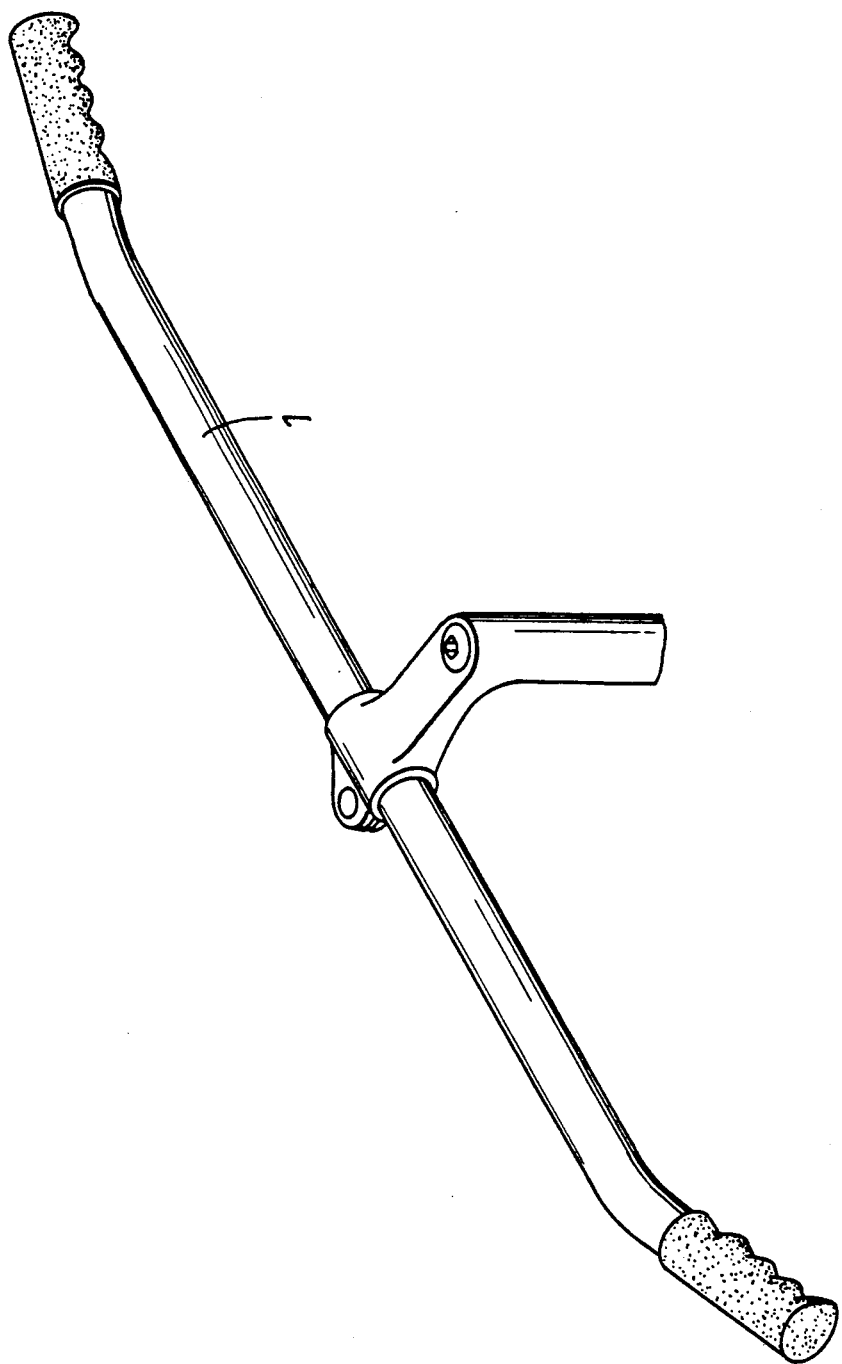
FIG. 1 is a perspective view of a conventional handlebar of a bicycle.
Figure 2:
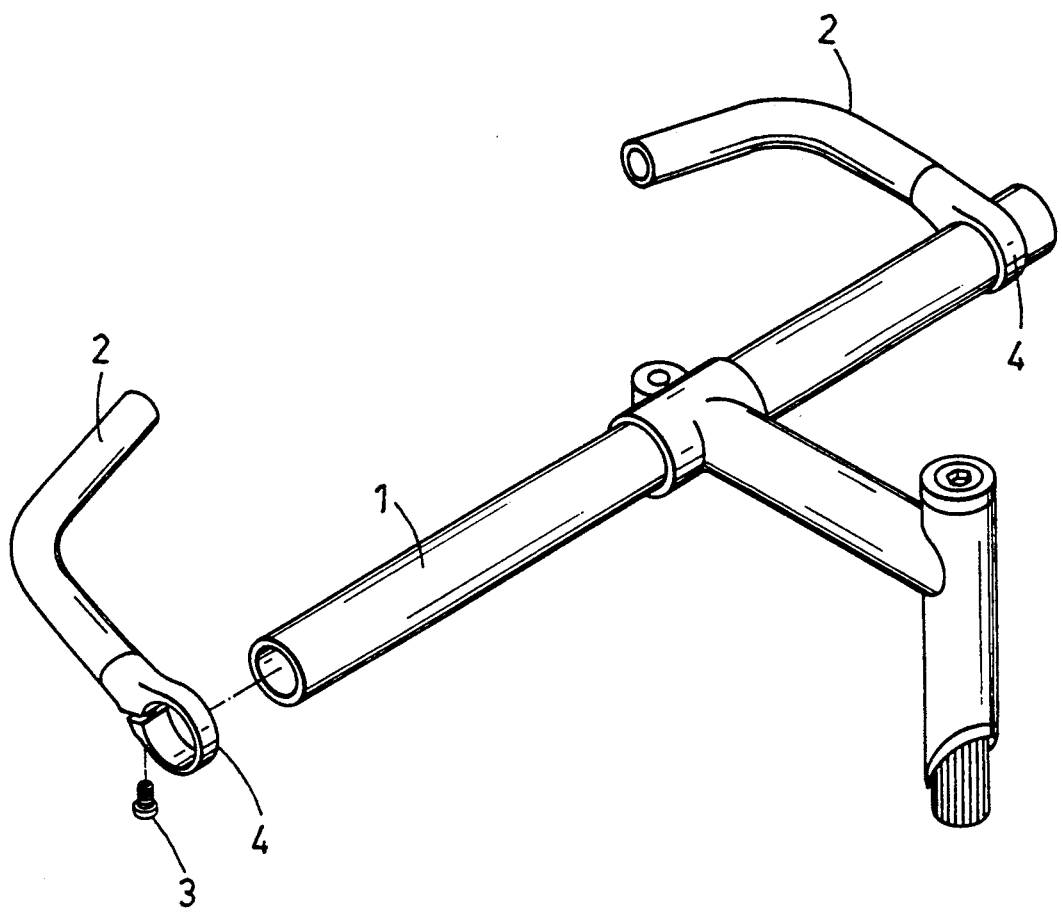
FIG. 2 is a partially perspective exploded view of a conventional handlebar of a bicycle which has two auxiliary handles provided thereto.
Figure 3:
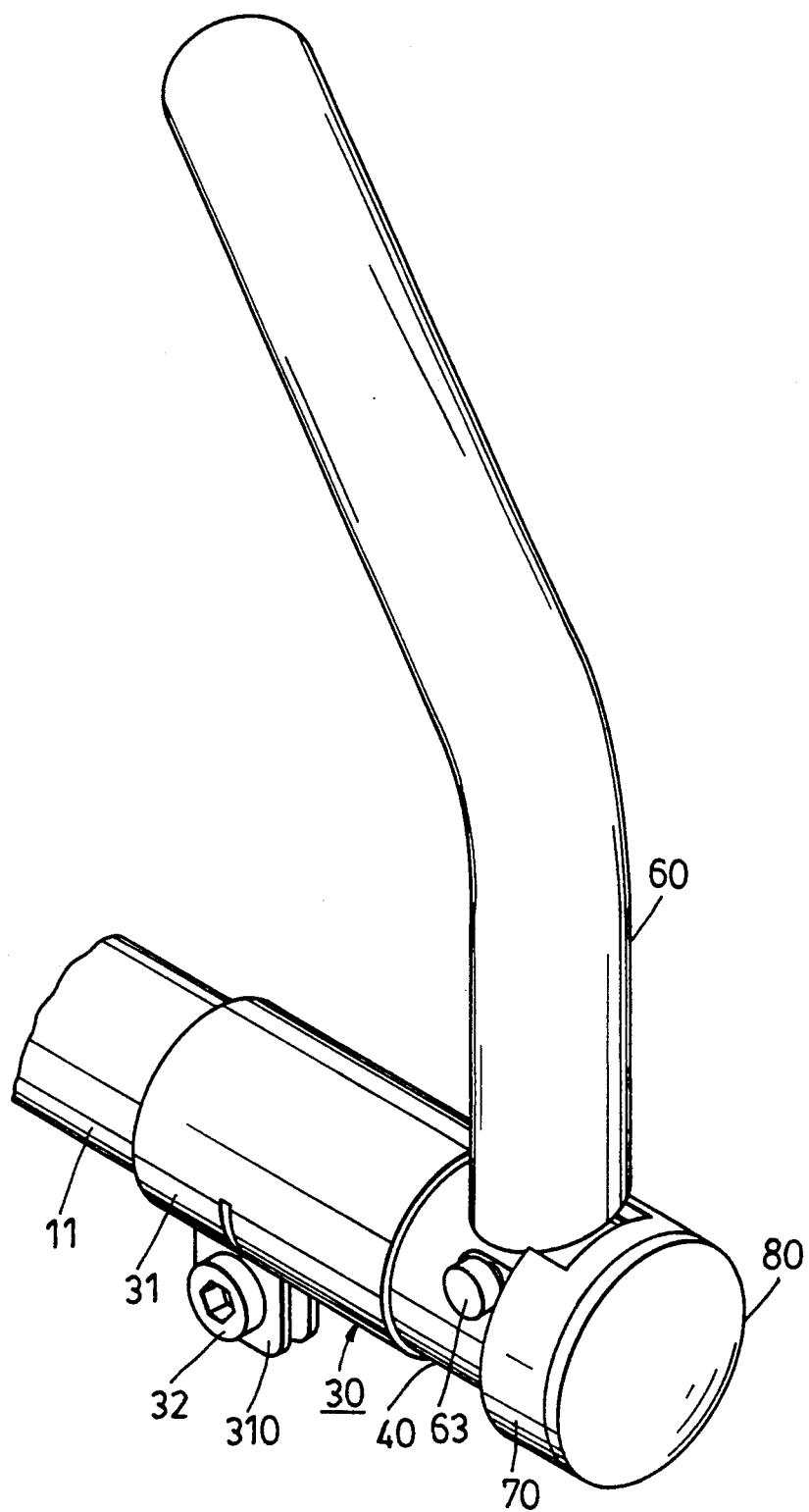
FIG. 3 is a perspective view of a first preferred embodiment of an apparatus for connecting an auxiliary handle to a handlebar of a bicycle of this invention.

FIG. 3 shows a perspective view of a first preferred embodiment of an apparatus for connecting an auxiliary handle 60 to a handlebar 11 of a bicycle of this invention. The apparatus comprises a tubular member 30, a cylindrical member 40, a bolt 50 and a lever arm 62, as best illustrated in FIG. 4.

Figure 4:
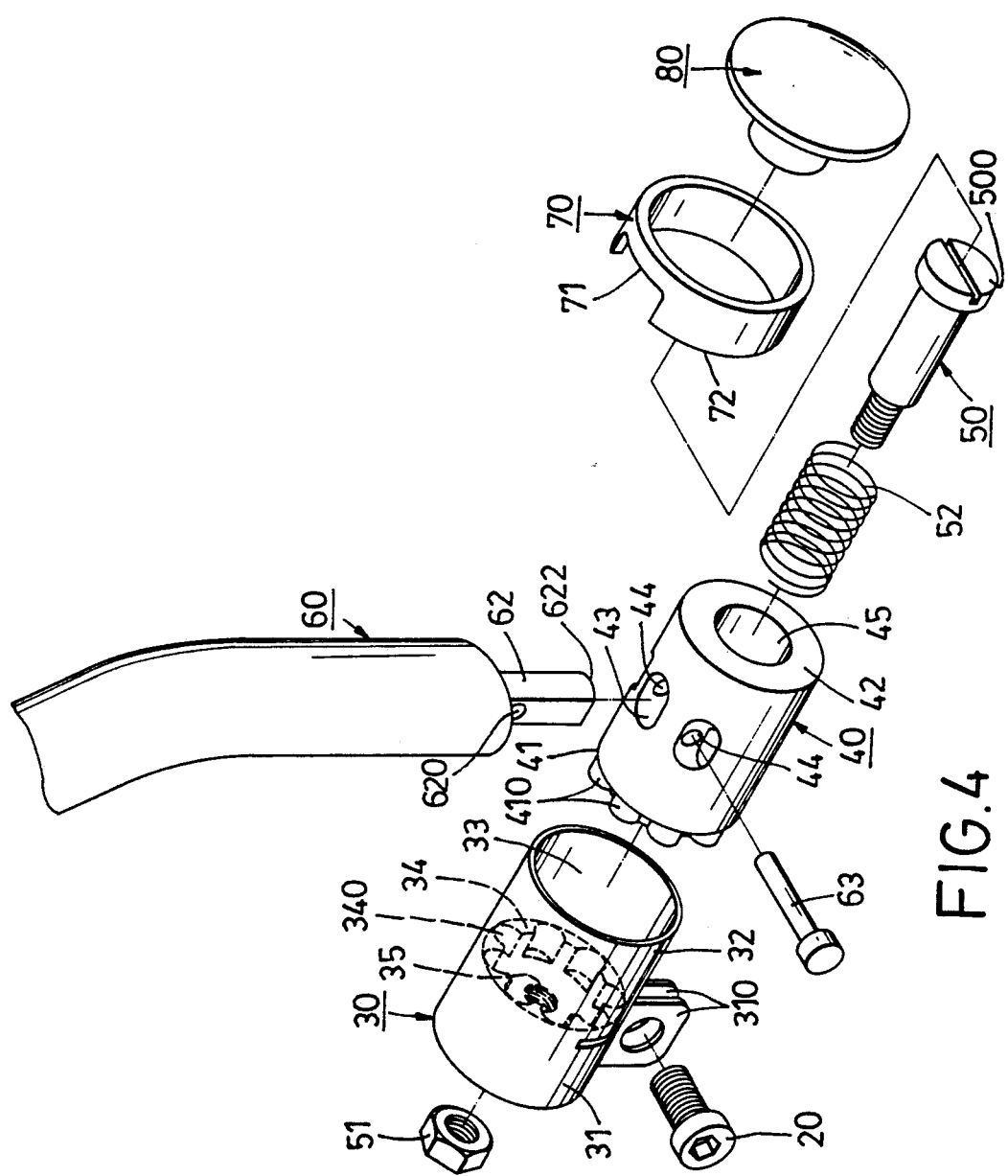
FIG. 4 a perspective exploded view of the first preferred embodiment of the apparatus for connecting an auxiliary handle to a handlebar of a bicycle of this invention.

FIG. 4 is a perspective exploded view of the first preferred embodiment of the apparatus for connecting the auxiliary handle 60 to the handlebar 11 of a bicycle of this invention. The tubular member 30 has a partition plate 34 with a central threaded hole 35 provided therein. The partition plate 34 divides the tubular member 30 into a first section 31 and a second section 32 with a central bore 33. The first section 31 of the tubular member 30 is adapted to clamp an end of the handlebar 11 by threading a screw 20 through a pair of lugs 310 which depend from a slot (not shown) in the lower face of first section 31 of the tubular member 30. The second section 32 of the tubular member has a first engaging member in the form of a plurality of circumferentially and equally spaced grooves 340 formed at one side of the partition plate 34.

Figure 6:
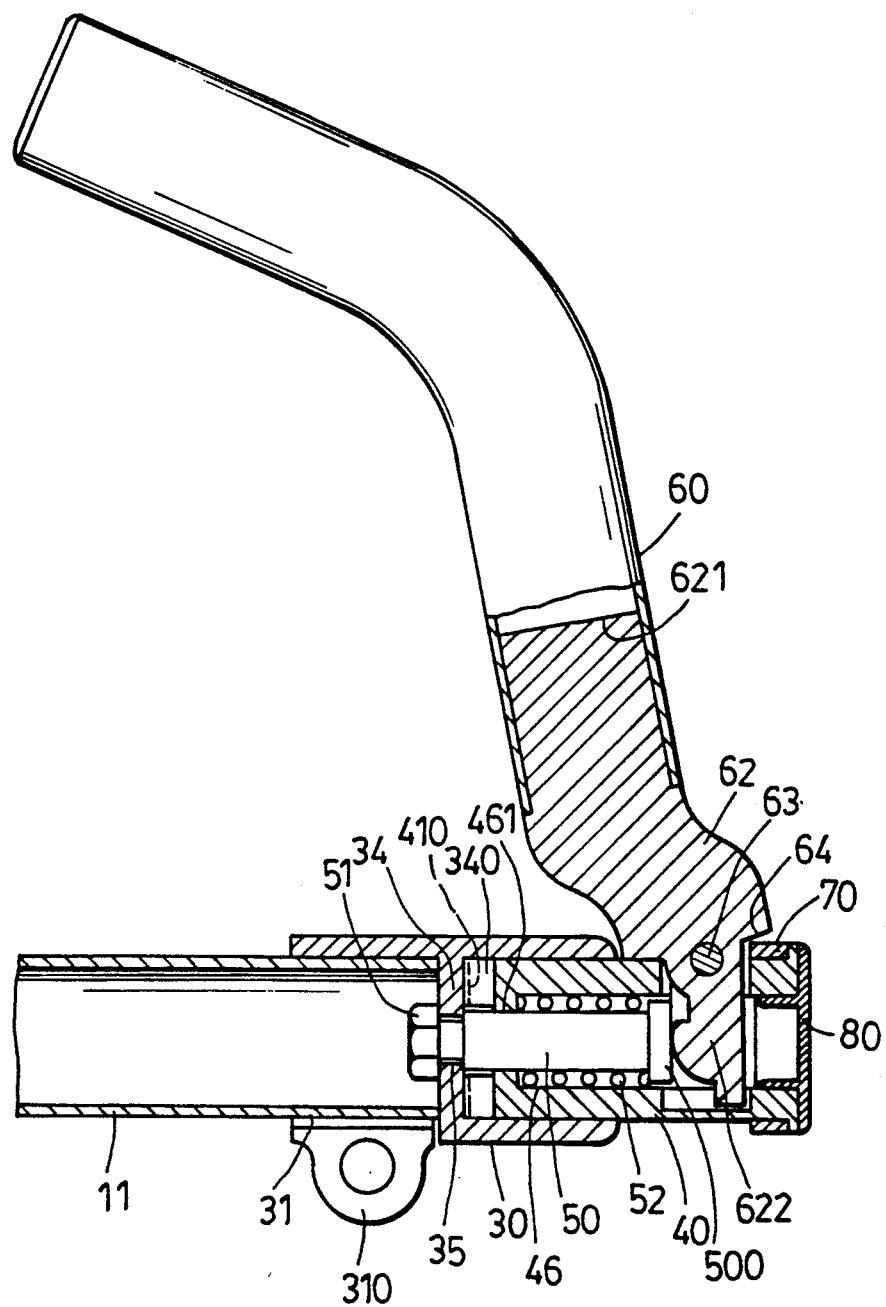
FIG. 6 is a sectional view of a first preferred embodiment of the apparatus for connecting an auxiliary handle to a handlebar of a bicycle of this invention.

The cylindrical member 40 has a first end 41 and a second end 42. The first end 41 of the cylindrical member 40 is inserted into the second section 33 of the tubular member 30. The cylindrical member 40 has a blind bore 45 extending axially from the second end 42 to the first end 41 of the cylindrical member 40. The bottom 46 of the blind bore 45 is formed near the first end 41 of the cylindrical member 40 and has a central opening 461 aligned with the central threaded hole 35 of the partition plate 34 of the tubular member 30, as best illustrated in FIG. 6. The first end 41 the cylindrical member 40 further has a second engaging member formed correspondingly thereon which is in the form of a plurality of projections 410. The second engaging member 410 engages the first engaging member 340 of the tubular member 30 in order to prevent the cylindrical member 40 and tubular member 30 being rotated with respect to each other. The cylindrical member 40 has a radial hole 43 which intercommunicates the blind bore 45 and the exterior of the cylindrical member 40.

Referring now to FIGS. 4 and 6, the bolt 50 has a threaded end 501 threaded to the central threaded hole 35 of the partition plate 3 of the tubular member 30 and a nut 51 and an enlarged end 500. A spring member 52 is disposed around the bolt 50 between the enlarged head 500 of the bolt 50 and the bottom 46 of the blind bore 45 of the cylindrical member 40, urging the first end 41 of the cylindrical member 40 toward the partition plate 34 of the tubular member 30 in order to allow the first and second engaging members 340 and 410 to engage each other, as best illustrated in FIG. 6.

Figure 5:
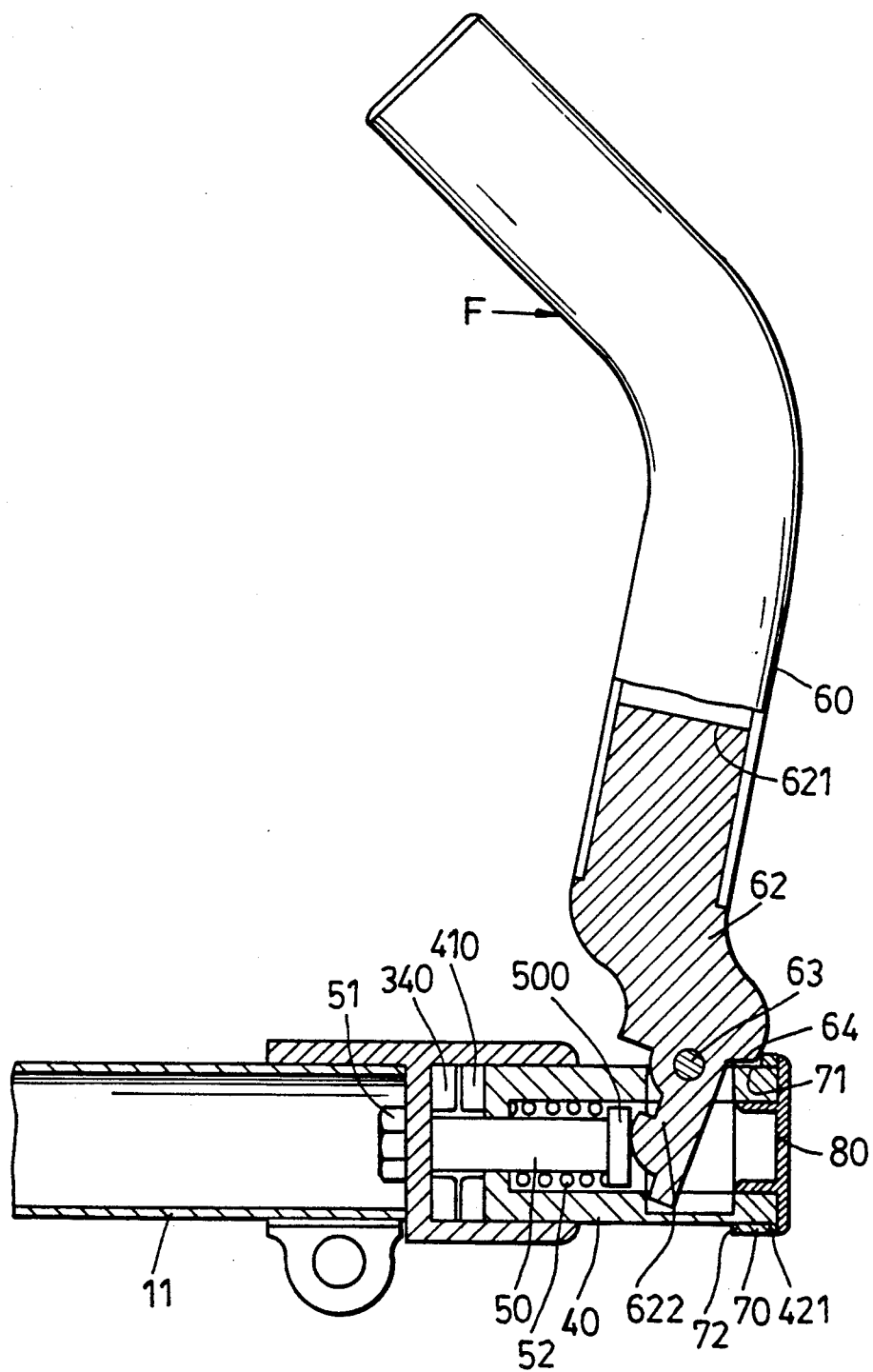
FIG. 5 is a sectional view of the first preferred embodiment of the apparatus for connecting an auxiliary handle to the handlebar of the bicycle of this invention when being used.

The lever arm 62 has a first end 621 and a second end 622 extending into the blind bore 45 of the cylindrical member 40 through the radial hole 43 of the cylindrical member 40. The first end 621 of the lever arm 62 is connected to the auxiliary handle 60. The lever arm 62 has a pivot hole 620 formed through the intermediate portion of the lever arm 62. A pin 63 passes transversely through the pivot hole 620, the radial hole 43 of the cylindrical member 40 and two holes 44 which are formed in the wall of the cylindrical member 40 at two sides of the radial hole 43. Thereby, the lever arm 62 can be pivoted to the cylindrical member 40 with the second end of the lever arm 622 abutting against the enlarged head 500 of the bolt 50. Therefore, the lever arm 62 can push the second end 42 of the cylindrical member 40 to move away from the tubular member 30 in order to disengage the second engaging member 410 from the first engaging member 340 when the auxiliary handle 60 is pushed by a force (F), and therefore the first end of the lever arm 621 is pushed to rotate clockwise, as best illustrated in FIG. 5. In this stage, the auxiliary handle 60 may be freely rotated about the handlebar 11 of the bicycle in order to obtain the proper grasping angle for the rider when he/she rides. The lever arm 62 may be rotated counterclockwise to allow the second end 42 of the cylindrical member 40 to move toward the tubular member 30 in order to permit the second engaging member 410 to engage the first engaging member 340 by means of the restoring force of the spring member 52, as best illustrated in FIG. 6. Therefore, the auxiliary handle 60 is then again positioned with respect to the handlebar 11 of the bicycle.

Referring to FIGS. 4 and 5, the second end 42 of the cylindrical member 40 has an end cap 80, a positioning ring 70 rotatably mounted therearound and a radial flange 421 which prevents the positioning ring 70 from being detached from the cylindrical member 40. One end 72 of the positioning ring 70 is located below a shoulder 64 of the lever arm 62 in order to prevent the lever arm 62 from being rotated clockwise. This is a safety locking device which protects the first and second engaging members 340 and 410 from being unintentionally disengaged from each other. The end 72 of the positioning ring 70 has a notch 71, allowing the lever arm 62 to rotate when the notch is rotating below the shoulder 64 of the lever arm 62, as best illustrated in FIG. 5.

Figure 7:
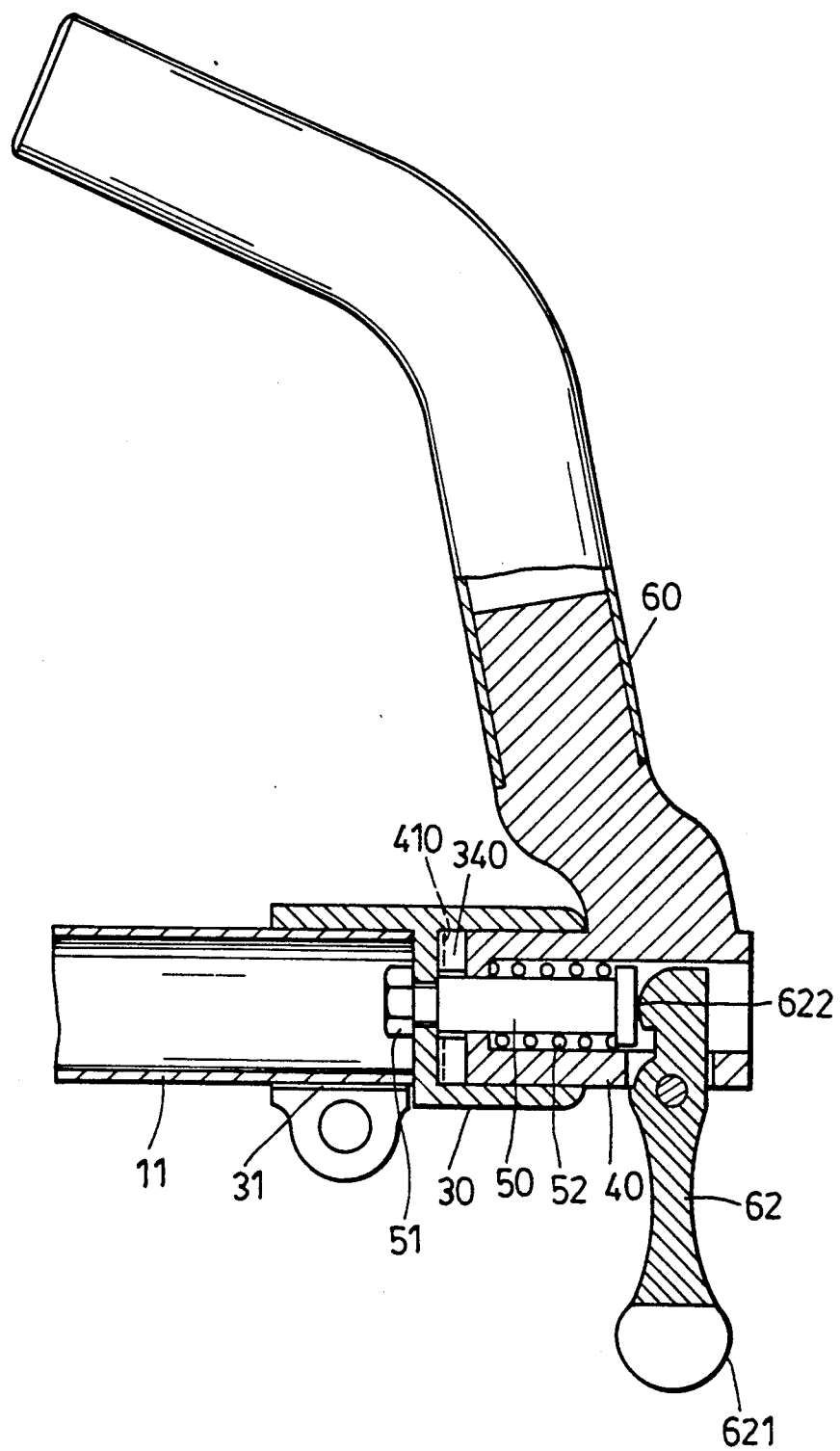
FIG. 7 is a sectional view of a second preferred embodiment of an apparatus for connecting an auxiliary handle to the handlebar of the bicycle of this invention.
Figure 8:
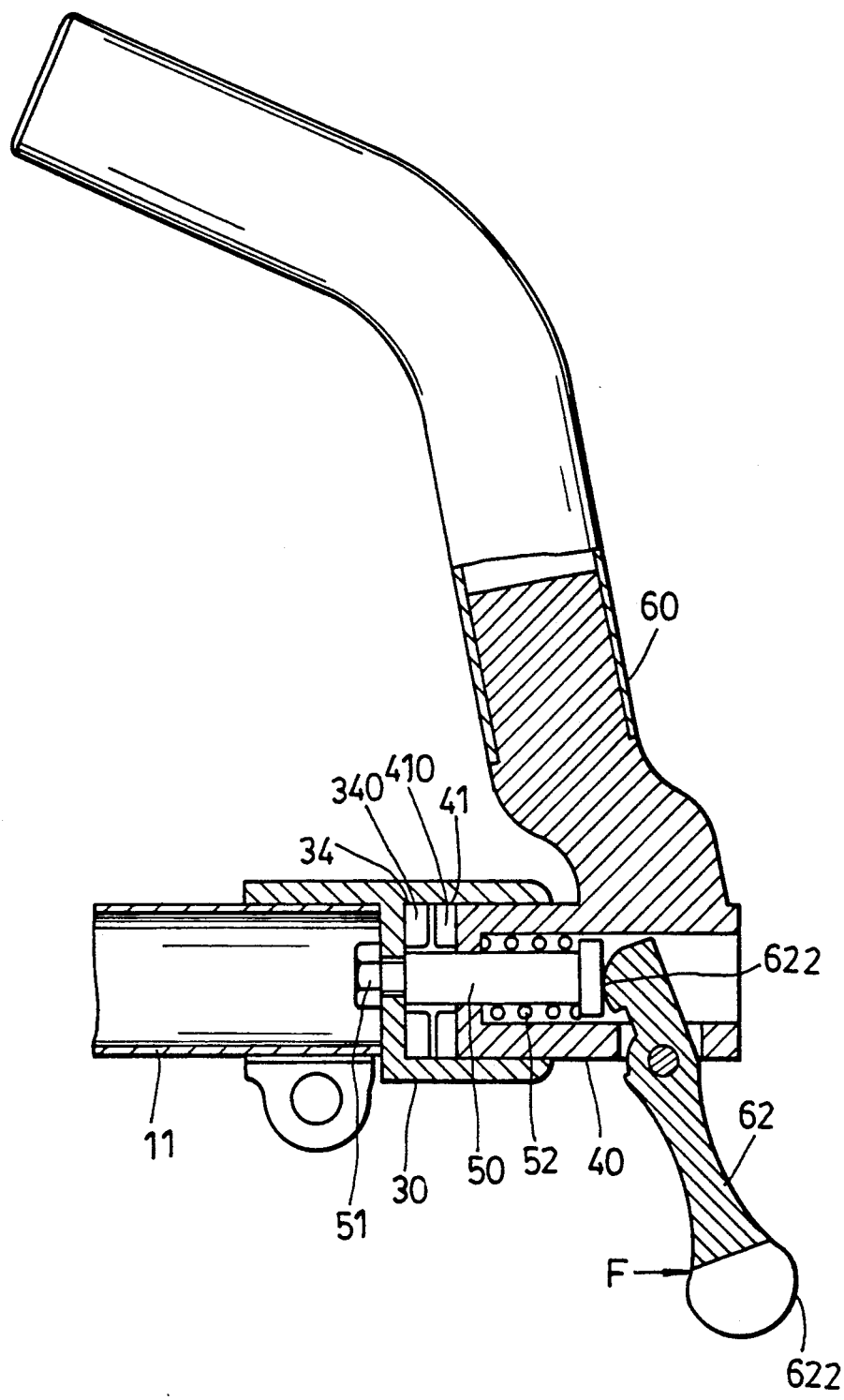
FIG. 8. is a sectional view of the second preferred embodiment of the apparatus for connecting an auxiliary handle to the handlebar of the bicycle of this invention when being used.

FIG. 7 shows a sectional view of a second preferred embodiment of an apparatus for connecting the auxiliary handle 11 to the handlebar of the bicycle of this invention. The structure of the apparatus of the second embodiment is similar to that of the apparatus of the first embodiment except that the auxiliary handle 60 is connected to the external face of the cylindrical member 40. The lever arm 62 can be operated in the manner similar to that in the first embodiment in order to move the cylindrical member 40, as shown in FIG. 8.

Figure 10:
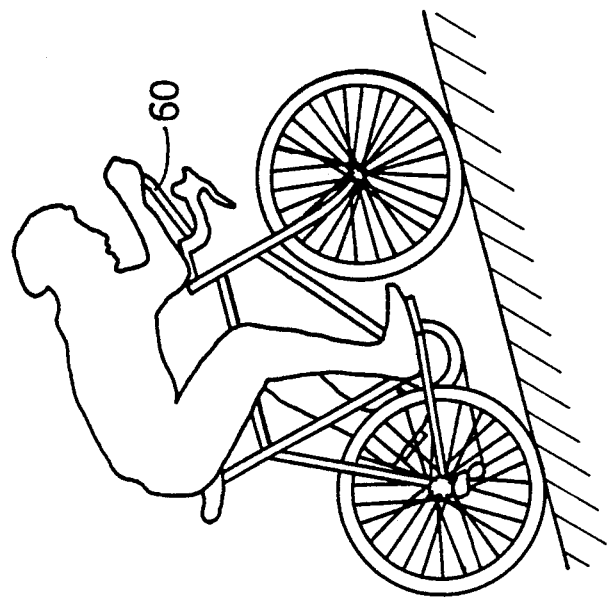
FIG. 10 is a schematic view illustrating the apparatus for connecting an auxiliary handle to the handlebar of the bicycle of this invention being used when a rider is riding on a ramp.
Figure 9:
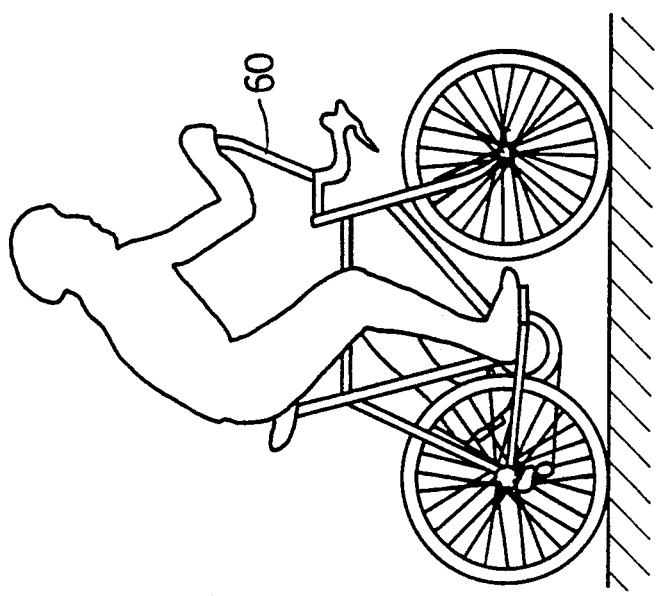
FIG. 9 is a schematic view illustrating the apparatus for connecting an auxiliary handle to the handlebar of the bicycle of this invention being used when a rider is riding on an usual road.

Therefore, the rider can easily and conveniently position the auxiliary handle 60 with respect to the handlebar 11 of the bicycle while he/she is riding. The rider may position the auxiliary handle 60 upright when he/she rides on an usual and substantial horizontal road, as best illustrated in FIG. 9. Alternatively, the rider may rotate the auxiliary handle 60 forward by means of the apparatus of this invention in order to obtain a proper grasping angle for riding while riding on a ramp, as best illustrating in FIG. 10.

With this invention thus explained, it is apparent that numerous modifications and variations can be made without departing from the scope and spirit of this invention. It is therefore intended that this invention be limited only as indicated in the appended claims.

I claim:

1. An apparatus for connecting an auxiliary handle to a handlebar of a bicycle, said apparatus comprising:
 a tubular member having a partition plate with a central threaded hole provided therein, said partition plate dividing said tubular member into a first section which is adapted to clamp an end of said handlebar and a second section with a central bore, said second section of said tubular member having a first engaging member formed therein;

a cylindrical member with a first end and a second end, said first end of said cylindrical member being inserted into said second section of said tubular member, said cylindrical member having a blind bore extending axially from said second end to said first end of said cylindrical member, a bottom of said blind bore which is formed near said first end of said cylindrical member and has a central opening aligned with said central threaded hole of said partition plate of said tubular member, said first end of said cylindrical member further having a second engaging member which engages said first engaging member of said tubular member in order to prevent said cylindrical member and tubular member being rotated with respect to each other, said cylindrical member having a radical hole which intercommunicates said blind bore and the exterior of said cylindrical member;

a bolt having a threaded end threaded to said central threaded hole of said partition plate of said tubular member and an enlarged end;

a spring member disposed between said enlarged head of said bolt and said bottom of said blind bore of said cylindrical member, urging said first end of said cylindrical member toward said partition plate of said tubular member in order to allow said first and second engaging members to engage each other; and a lever arm having a first end and a second end extending into said blind bore of said cylindrical member through said radical hole of said cylindrical member, said second end of said lever arm abutting against said enlarged head of said bolt, said lever arm being pivoted to said cylindrical member in such a manner that said lever arm pushes said second end of said cylindrical member to move away from said tubular member in order to disengage said second engaging member from said first engaging member when said first end of said level arm is rotated clockwise, said lever arm being rotated counterclockwise to allow said second end of said cylindrical member to move toward said tubular member in order to permit said second engaging member to engage said first engaging member by means of the restoring force of said spring member.

2. The apparatus as claimed in claim 1, wherein said second end of said lever arm is connected to said auxiliary handle.

3. The apparatus as claimed in claim 1, wherein said auxiliary handle is connected to an external face of said cylindrical member.

4. The apparatus as claimed in claim 1, wherein said first engaging member includes a plurality of circumferentially and equally spaced grooves formed at one side of said partition plate; and wherein said second engaging member includes a plurality of projections formed correspondingly on said first end of said cylindrical member.

5. The apparatus as claimed in claim 1, wherein said lever arm has a shoulder and wherein said second end of said cylindrical has a ring mounted rotatably thereto and a radial flange which prevents said ring from being detached form the second end of said cylindrical member said ring having an end which is located below said shoulder of said lever arm and which has a notch formed therein.

* * * * *